United States Patent
Doelling et al.

[19]

[11] Patent Number: 6,135,669

[45] Date of Patent: Oct. 24, 2000

[54] REUSABLE APPARATUS TO ECONOMICALLY CONNECT TWO RODS

[76] Inventors: Mark D. Doelling, 800 Starlight Dr., Atlanta, Ga. 30342; Michael C. Sacher, 2955 Ascot La., Roswell, Ga. 30076

[21] Appl. No.: 09/144,291

[22] Filed: Aug. 31, 1998

[51] Int. Cl.[7] ........................................... B25G 3/18
[52] U.S. Cl. ..................... 403/353; 403/309; 403/213; 403/313
[58] Field of Search ................................. 403/353, 300, 403/305, 309, 310, 311, 313, 213; 24/129 R, 130, 129 A, 702, 684; 248/318, 339, 341, 243, 222.11

[56] References Cited

U.S. PATENT DOCUMENTS

| | | | |
|---|---|---|---|
| 2,630,303 | 3/1953 | Krucker | 403/353 X |
| 3,510,010 | 5/1970 | Gasner | 248/243 X |
| 3,936,914 | 2/1976 | Mancini | 24/684 |
| 4,515,494 | 5/1985 | Robilliard et al. | 248/243 X |
| 4,648,161 | 3/1987 | Rosen | 24/702 X |
| 5,836,061 | 11/1998 | Castillo et al. | 24/702 |

OTHER PUBLICATIONS

Hook–Up ™ Hanger, Metz Farms, 1650 Broadway NW, Grand Rapids, MI 49504.

Hook–It–All™ Hanger, Perky–Pet Products, Inc., 2201 South Wabash Street, Denver, CO 80231.

The Easy Lift Hanger, Easy Lift Hanger Co., P.O. Box 755, Fairfield, OH 45018.

The Hookery, Handmade Wrought Iron Products, JCTS Buyer's Guide, p. 79.

Steel Craft Products, P.O. Box 4434, Rock Hill, SC 29732, 1999 Birding Products Buyers Guide, p. 54.

One of Life's Little Pleasures, Bird Watcher's Digest, Jan./Feb. 1999; Survival Project, P.O. Box 99, Minden, NV 89423, p. 9.

The Ultimate Squirrel Guard, 1999 Birding Products Buyer's Guide, p. 51; ERVA, 3100 West Grand Ave., Chicago, IL 60622–4324.

Out on a Limb™, 1999 Birding Products Buyer's Guide, p. 35; Out on a Limb™ Outdoor Products, P.O. Box 250, Wauconda, IL 60084.

HandyPost™, Form: HPS/HPD 11–92 10M, Universal Industrial Products Company, One Coreway Drive, P.O. Box 628, Pioneer, OH 43554–0628, 1992.

HandyPost™, Form No. 494–10M;, Universal Industrial Products Company, One Coreway Drive, Pioneer, OH 43554–0628.

Green Esteem, Catalog No. 3, 1999 Birdfeeding & Garden Accesories; Hiatt Manufacturing, Inc., 4410 Theurer Blvd., Winona, MN 55987.

*Primary Examiner*—Lynne H. Browne
*Assistant Examiner*—John R. Cottingham
*Attorney, Agent, or Firm*—Kennedy, Davis & Hodge LLP

[57] ABSTRACT

A cylindrical shape with a open channel running the entire length (7). Opposite of the channel is a rib (5) added for strength and rigidity of the connector. Four openings (1) with a 45 degree angle (2) used for clearance open to four slots (3). Each slot is in line with another forming two groups which allow a flattened end of a rod to be inserted, lowered, and snapped in place. Inserting a rod into both groups creates a simple, economical, and reusable connection. Four tabs (4) protrude into the channel with a center line just above the top of the rod to be inserted allowing the rod to be held firmly in the connector and creating a barrier that doesn't permit the rod to start moving perpendicular to the connector which is how the rod is inserted and taken out. The length and width (6) of the material can vary depending on the weight requirements. A coated or inherently corrosion resistant alloy or a plastic that can resist the eliminates of the outdoors is appropriate.

3 Claims, 2 Drawing Sheets

REUSABLE APPARATUS TO ECONOMICALLY CONNECT TWO RODS

BACKGROUND

1. Field of Invention

This invention relates to a connector, specifically a economical, simple, reusable connector to join two rods to hang various items.

2. Description of Prior Art

There is a need to hang items such as bird house, bird feeders, plants, flowers, outdoor lanterns and other items. These hangers need to be reusable and adjustable to allow for hanging different items at different lengths at different times. They also must be lightweight to make hanging easy yet strong enough to hold a sufficient weight. The design should be simple enough to install and use with out using additional tools and must be of design as not to be able to easily or unintentionally come apart.

The current methods to hang items use a threaded rod and circular connector that has been tapped to receive the threaded rod. A person needs tools to tighten this connection and unless a secondary item or liquid lock tight is used, this method may came loose and the hanging item may fall. The likelihood of the secondary locking device being used is low because they are not included in the hanger when purchased. A animal swinging on the feeder or the wind and may cause enough torque to loosen this connection which may eventually come apart causing the item that was hung to fall to the ground. The current methods of manufacture are complex and expensive.

OBJECTS AND ADVANTAGES

The object and advantages of the present invention are:

(a) to provide a connector between two rods that can easily be used requiring no additional tools for installation.

(b) to provide a reusable connector to make assembling and disassembling easy and quick.

(c) to provide a lightweight yet strong design.

(d) to provide a fool proof method of connection that does not rely on any secondary parts, liquids, or compounds.

(f) to provide a corrosion resistant alloy, plastic, or other material so connector may be used outdoors.

(g) to provide a connector that is simple and economical to manufacture.

Further objects and advantages will become apparent from the consideration of the ensuing description of drawings.

REFERENCE NUMERALS ON DRAWINGS

1. Opening
2. 45 degree angles
3. Slot
4. Depressed tabs
5. Rib
6. Thickness
7. Distance of opening of channel
8. Connector
9. Rod

SUMMARY

In accordance with the present invention, a connector in a cylindrical shape that has a open channel running down the entire length, with four openings that have 45 degree angles that open into four slots, with a rib running down seventy five percent of the length opposite of the channel for strength with four protruding tabs in the channel that help secure a rod.

DESCRIPTION

Figure 1:
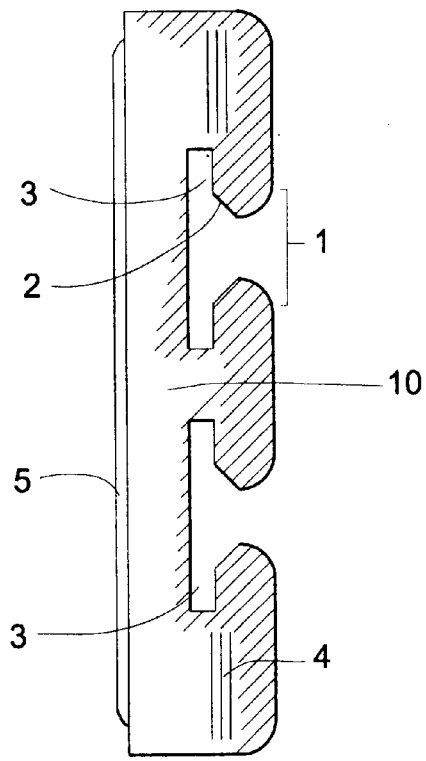
FIG. 1 Is a side view of the connector showing the slots, angles and tab.
Figure 4:
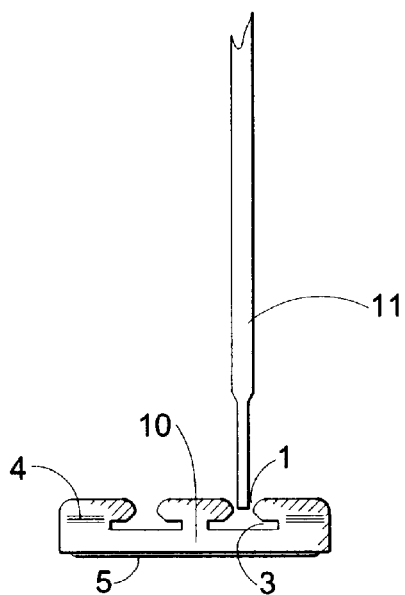
FIG. 4 Shows how a rod with a flattened end is inserted into the connector and dropped into a hanging position.
Figure 4:
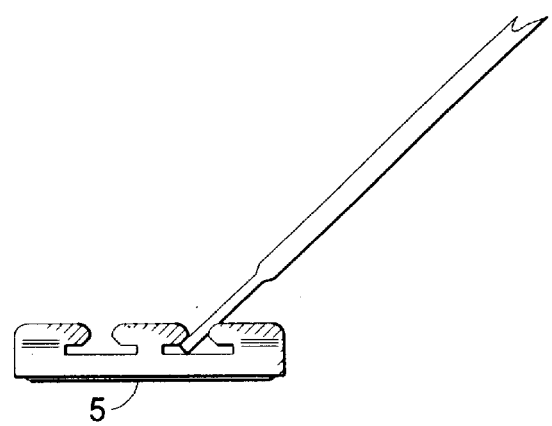
Figure 5:
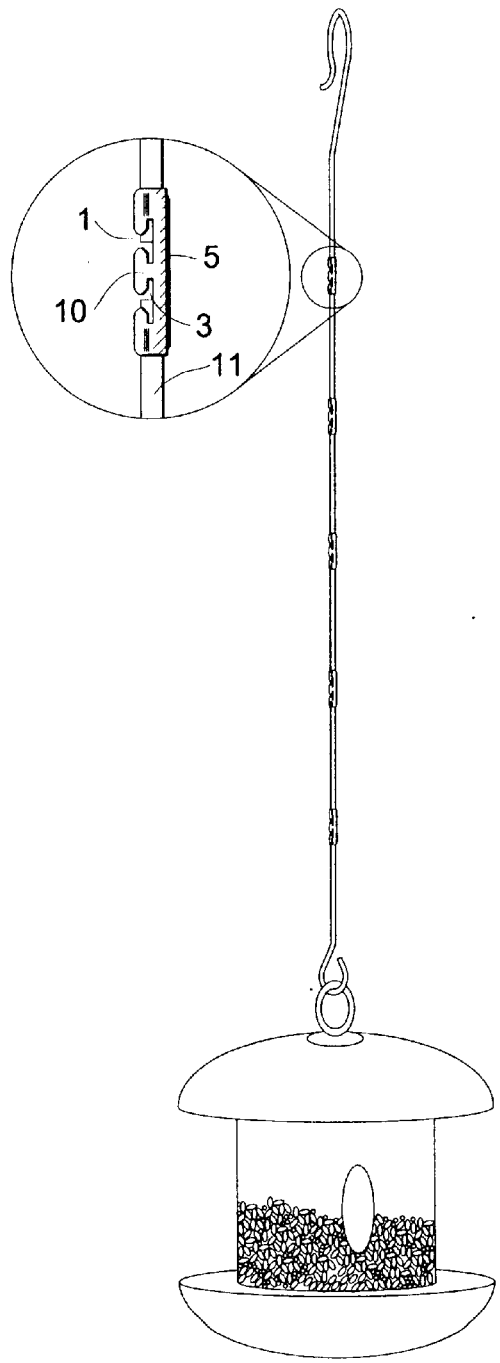
FIG. 5 Shows how the rods and connector are used together to make a hanger.

A typical embodiment of the connector 10 of the present invention is illustrated in FIG. 1. The use of the connector by inserting the rods 11 with a flattened end is shown in FIG. 4. Combining the connectors and rods shows the entire hanging assembly as illustrated in FIG. 5.

A rod with a flattened end is held perpendicular to the connector and inserted in the opening 1 (FIG. 4) then dropped and snapped into place. The 45 degree opening 2 (FIG. 1) is to allow the flattened end of the rod clearance as it swings into the slot. This allows the opening to be as small as possible after taking into consideration production tolerance on both the flattened rod and producing the opening. The smaller the opening the better on eliminating the chances of the rod ever coming out unintentionally.

Figure 2:
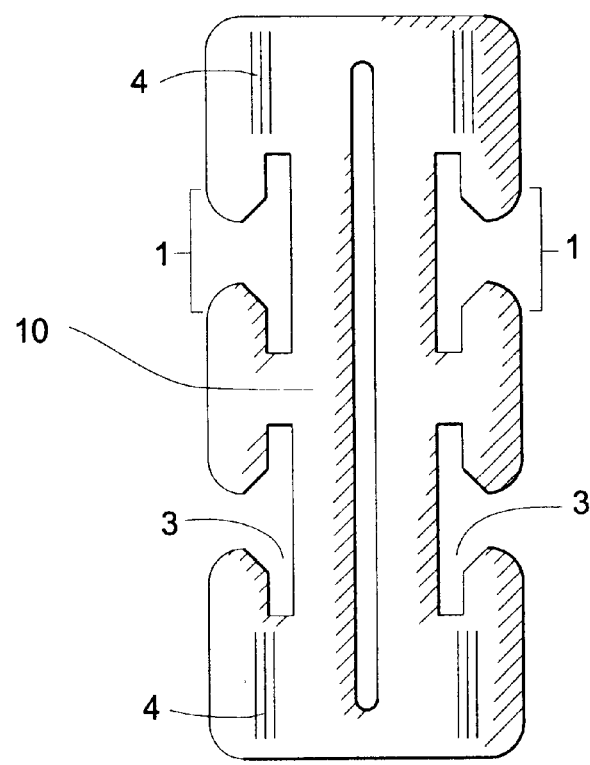
FIG. 2 Is an end view showing the location of the rib.
Figure 3:
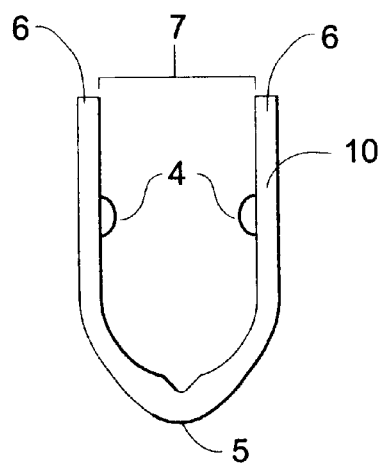
FIG. 3 Is a connector that has been flattened to show the relationships of the slots, angles, tabs, and rib to the overall length.

There are four slots 3 (FIG. 2) which allow the ends of the flattened rod to travel the entire distance but still be encapsulated and not let the rod start to move in a perpendicular motion that could eventually allow the rod to come out. The slots allow the rod to travel while the assembly is being pushed or hoisted into the air to be hung over a branch or placed in an eyelet. After the item has been hung the flattened rod will rest at the bottom of the slot and be held by the gravity on the rod and item that is being hung. To help ensure the rod will never start moving in a motion perpendicular to the connector, four protruding tabs 4 (FIGS. 2&3) are placed inside of the channel 7 (FIG. 3) to help hold the rod. These protrusions center lines are located approximately three quarters up the top of the rod, as shown in FIG. 3 to hold the rod firmly inside the channel. The protrusion are at such a depth to keep the rod from rotating on one point. The depth of the protrusion is sufficient to help hold the rod firmly in place but not enough to prohibit the rod from being inserted. A rib 5 (FIG. 4) runs down seventy five percent of the length of the opposite side of the connector from the open channel. This rib contributes to the strength of the connector which allows the thickness of the material to be kept at a minimum. The connector is of uniform thickness 6 (FIG. 3) which is determined by weight expected on the assembly.

SUMMARY

Accordingly the reader will see that the connector is a simple and economical way to join two rods. In addition, it is easy to use requiring no additional tools or locking devices to hold the rods in place. Almost a fool proof method of holding the rods in place is being used—gravity. Four tabs protrude into the channel to hold the rod firmly in the connector and keep the rod from starting any movement that would be perpendicular to the connector and could allow the rod to come out of the slots. The connector permits assembly and disassembly quickly and easily, allowing for this connector to be reused. The design is simple but strong and rigid because of the rib which runs down at least seventy five percent of the side opposite of the channel opening.

Although the description above contains many specificity's, these should not be construed as limiting the scope of the invention but merely providing an illustration. For example, the material can be coated or an inherently corrosion resistant steel alloy, aluminum, plastic, or other composite material that can withstand the outdoor elements. The length and width of the connector can vary depending on the weight requirements.

What is claimed is:

1. An apparatus used to connect two rods that each have at least one flattened end, comprising:

a channel having opposing side walls and a web therebetween defining an opening running the length of the channel to allow a rod with the flattened end to be disposed longitudinally therein;

opposing side walls of the channel defining two aligned pairs of openings, each opening defining an oblique angle on an inner side for clearance of the flattened end while the rod is being inserted, lowered, and snapped into place in the channel;

the opposing side walls each defining two coaxially-aligned, spaced-apart slots which are open to the openings for the flattened end of the rod to travel in depending if the rods are being hoisted up or the rod is seated while being held by weight and gravity; and four tabs protruding from opposing side walls inside of the channel for holding the rods seated in the channel.

2. The apparatus as recited in claim 1, further comprising a rib extending parallel to a longitudinal axis of the channel on an exterior surface of the channel opposite the opening for strength and rigidity.

3. The apparatus as recited in claim 2, wherein the rib extends approximately seventy five percent of the length of the channel.

\* \* \* \* \*